US012626713B2

(12) United States Patent
Liu et al.

(10) Patent No.: US 12,626,713 B2
(45) Date of Patent: May 12, 2026

(54) DYNAMIC VOICE NULLFORMER

(71) Applicant: Bose Corporation, Framingham, MA (US)

(72) Inventors: Yang Liu, Boston, MA (US); Abinaya Subramaniam, Westborough, MA (US); Trevor Caldwell, Menlo Park, CA (US); Douglas George Morton, Southborough, MA (US)

(73) Assignee: Bose Corporation, Framingham, MA (US)

( * ) Notice: Subject to any disclaimer, the term of this patent is extended or adjusted under 35 U.S.C. 154(b) by 372 days.

(21) Appl. No.: 17/819,177

(22) Filed: Aug. 11, 2022

(65) Prior Publication Data

US 2024/0055011 A1 Feb. 15, 2024

(51) Int. Cl.
*G10L 21/0232* (2013.01)
*G10L 21/0208* (2013.01)
(Continued)

(52) U.S. Cl.
CPC .......... *G10L 21/0232* (2013.01); *G10L 25/84* (2013.01); *G10L 2021/02166* (2013.01); *H04R 1/406* (2013.01); *H04R 3/005* (2013.01)

(58) Field of Classification Search
USPC .......................................................... 381/86
See application file for complete search history.

(56) References Cited

U.S. PATENT DOCUMENTS 10,424,315 B1 * 9/2019 Ganeshkumar ...... H04R 1/1008
11,140,469 B1 10/2021 Miller et al.
(Continued)

FOREIGN PATENT DOCUMENTS

CN 117153180 A * 8/2022 .......... G10K 11/178
DE 2146519 A1 * 1/2010 .............. H04R 3/00
(Continued)

OTHER PUBLICATIONS

Siow Yong Low et al., "Robust microphone array using subband adaptive beamformer and spectral subtraction," 2002 (Year: 2002).*
(Continued)

*Primary Examiner* — Farzad Kazeminezhad
(74) *Attorney, Agent, or Firm* — Bond, Schoeneck & King, PLLC

(57) ABSTRACT

A voice capture system including a first and second voice beamformer, a voice mixer, a voice rejected noise beamformer, a noise beamformer adjustor, a jammer suppressor, and a speech enhancer is provided. The first and second voice beamformer and the voice mixer generate a voice enhanced reference signal based on a first and second frequency domain microphone signal. The voice rejected noise beamformer includes filter weights and generates a noise reference signal based on the first and second frequency domain microphone signal. The noise beamformer adjustor adjusts the one or more filter weights of the voice rejected noise beamformer to account for fit variation. The jammer suppressor generates a jammer suppressed signal based on the voice enhanced reference signal and the noise reference signal. The speech enhancer dynamically generates an output voice signal by applying a dynamic noise suppression signal to each frequency bin of the jammer suppressed signal.

15 Claims, 12 Drawing Sheets

(51) Int. Cl.

| | |
|---|---|
| ***G10L 21/0216*** | (2013.01) |
| ***G10L 25/84*** | (2013.01) |
| ***H04R 1/40*** | (2006.01) |
| ***H04R 3/00*** | (2006.01) |

(56) References Cited

U.S. PATENT DOCUMENTS

| | | | | |
|---|---|---|---|---|
| 11,315,586 | B2 * | 4/2022 | Huang | G10L 25/30 |
| 11,749,262 | B2 | 9/2023 | Gao et al. | |
| 2008/0317259 | A1 * | 12/2008 | Zhang | G10L 15/04<br>381/94.1 |
| 2014/0064514 | A1 * | 3/2014 | Mikami | G10L 21/0208<br>381/86 |
| 2014/0278394 | A1 * | 9/2014 | Bastyr | G10L 21/0208<br>381/92 |
| 2018/0359572 | A1 * | 12/2018 | Jensen | H04R 25/407 |
| 2021/0337306 | A1 * | 10/2021 | Pedersen | H04R 25/407 |

FOREIGN PATENT DOCUMENTS

| | | | |
|---|---|---|---|
| WO | 2014143439 | A1 | 9/2014 |
| WO | 2018175317 | A1 | 9/2018 |

OTHER PUBLICATIONS

Vamsynagh Pedamallu, "Microphone Array Wiener Beamforming with emphasis on Reverberation" (Year: 2012).*

International Search Report and the Written Opinion of the International Searching Authority, PCT Application No. PCT/US2023/034718, dated Apr. 26, 2024, pp. 1-12.

* cited by examiner

DYNAMIC VOICE NULLFORMER

FIELD OF THE DISCLOSURE

The present disclosure is generally directed to a dynamic voice capture system for wearable audio devices.

BACKGROUND

One important aspect of a wearable audio device is the ability to capture voice audio from the wearer. Whether the captured speech is in the context of a voice call with another person, or entering a voice audio command in an electronic system, the clarity of the voice audio is important to the use of the device. In many cases, these wearable devices may have a wide range of in-ear or on-ear fitting variations for both an individual wearer, as well as across a variety of different wearers. In other cases, the fit of the wearable audio device may change while being worn, such as due to sweat or other factors. When the fit of the wearable audio device is different than anticipated by the manufacturer, voice capture performance may suffer due to the preprogrammed directionality of aspects of the voice capture system. Accordingly, there is a need for a voice capture system capable of dynamically adjusting according to fit variations.

SUMMARY

The present disclosure is generally directed to a dynamic voice capture system for wearable audio devices.

Generally, in one aspect, a voice capture system is provided. The voice capture system includes a voice enhanced reference signal. The voice enhanced reference signal is based on a first frequency domain microphone signal and a second frequency domain microphone signal.

The voice capture system further includes a voice rejected noise beamformer. The voice rejected noise beamformer includes one or more filter weights. The voice rejected noise beamformer is configured to generate a noise reference signal. The noise reference signal is based on the first frequency domain microphone signal and the second frequency domain microphone signal. According to an example, the voice rejected noise beamformer may be a Wiener delay and subtract noise beamformer. According to a further example, the one or more filter weights of the rejected noise beamformer correspond to a stock voice direction or a wearer-specific voice direction.

The voice capture system further includes a noise beamformer adjustor. The noise beamformer adjustor is configured to adjust the one or more filter weights of the voice rejected noise beamformer to account for fit variation.

The voice capture system further includes a jammer suppressor. The jammer suppressor is configured to generate a jammer suppressed signal. The jammer suppressed signal is based on the voice enhanced reference signal and the noise reference signal.

The voice capture system further includes a speech enhancer. The speech enhancer is configured to generate an output voice signal. The output voice signal is based on the jammer suppressed signal, the noise reference signal, and a voice detection signal. According to an example, the voice detection signal is generated by a voice activity detector based on the voice enhanced reference signal and the noise reference signal.

According to an example, the noise beamformer adjustor is configured to generate a signal-to-noise ratio (SNR) quality check signal. The SNR quality check signal is based on the second frequency domain microphone signal. The noise beamformer adjustor is further configured to generate, via a quality check voice activity detector, a voice detection quality check signal. The noise beamformer adjustor is further configured to store, via a first data accumulator, first voice data corresponding to a relationship between the first frequency domain microphone signal and the second frequency domain microphone signal. The noise beamformer adjustor is further configured to store, via a second data accumulator, second voice data corresponding to an energy level of the first frequency domain microphone signal. The noise beamformer adjustor is further configured to dynamically update, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

According to an example, the speech enhancer is configured to generate the output voice signal by: (1) determining a series of speech SNRs corresponding to a series of frequency bins based on the jammer suppressed signal and the noise reference signal; (2) comparing the speech SNRs of each frequency bin to a set of speech enhancer thresholds; and (3) applying a noise suppression signal to each frequency bin of the jammer suppressed signal, wherein an amplitude of the noise suppression signal applied to a frequency bin of the jammer suppressed signal is related to the SNR corresponding to the frequency bin.

According to an example, the voice enhanced reference signal is generated by a voice mixer based on a first voice beamformer signal and a second voice beamformer signal. The first voice beamformer signal may be generated by a first voice beamformer based on the first frequency domain microphone signal and the second frequency domain microphone signal. The first voice beamformer may be a minimum variance distortionless response (MVDR) beamformer. The second voice beamformer signal may be generated by a second voice beamformer based on the first frequency domain microphone signal and the second frequency domain microphone signal. The second voice beamformer may be a delay and sum beamformer.

According to an example, the voice capture system further includes a filter bank. The filter bank is configured to generate the first frequency domain microphone signal based on a first time domain microphone signal. The filter bank is further configured to generate the second frequency domain microphone signal based on a second time domain microphone signal.

According to an example, the voice capture system further includes a first microphone configured to generate the first time domain microphone signal and a second microphone configured to generate the second time domain microphone signal.

Generally, in another aspect, a wearable audio device is provided. According to an example, the wearable audio device may be a single side wearable device.

The wearable audio device includes a first microphone configured to generate a first time domain microphone signal.

The wearable audio device further includes a second microphone configured to generate a second time domain microphone signal.

The wearable audio device further includes a filter bank configured to generate a first frequency domain microphone signal based on the first time domain microphone signal and a second frequency domain microphone signal based on the second time domain microphone signal.

The wearable audio device further includes a first voice beamformer configured to generate a first voice beamformer signal based on the first frequency domain microphone signal and the second frequency domain microphone signal.

The wearable audio device further includes a second voice beamformer configured to generate a second voice beamformer signal based on the first frequency domain microphone signal and the second frequency domain microphone signal.

The wearable audio device further includes a voice rejected noise beamformer comprising one or more filter weights. The voice rejected noise beamformer is configured to generate a noise reference signal based on the first frequency domain microphone signal and the second frequency domain microphone signal.

The wearable audio device further includes a noise beamformer adjustor configured to adjust the one or more filter weights of the voice rejected noise beamformer to account for fit variation.

The wearable audio device further includes a voice mixer configured to generate a voice enhanced reference signal based on the first voice beamformer signal and the second voice beamformer signal.

The wearable audio device further includes a voice activity detector configured to generate a voice detection signal based on the voice enhanced reference signal and the noise reference signal.

The wearable audio device further includes a jammer suppressor configured to generate a jammer suppressed signal based on the voice enhanced reference signal and the noise reference signal.

The wearable audio device further includes a speech enhancer configured to generate an output voice signal based on the jammer suppressed signal, the noise reference signal, and the voice detection signal.

According to an example, the noise beamformer adjustor is configured to: (1) generate an SNR quality check signal based on the second frequency domain microphone signal; (2) generate, via a quality check voice activity detector, a voice detection quality check signal; (3) store, via a first data accumulator, first voice data corresponding to a relationship between the first frequency domain microphone signal and the second frequency domain microphone signal; (4) store, via a second data accumulator, second voice data corresponding to an energy level of the first frequency domain microphone signal; and (5) dynamically update, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

According to an example, the speech enhancer is configured to generate the output voice signal by: (1) determining a series of speech SNRs corresponding to a series of frequency bins based on the jammer suppressed signal and the noise reference signal; (2) comparing the speech SNRs of each frequency bin to a set of speech enhancer thresholds; (3) applying a noise suppression signal to each frequency bin of the jammer suppressed signal, wherein an amplitude of the noise suppression signal applied to a frequency bin of the jammer suppressed signal is related to the SNR corresponding to the frequency bin.

Generally, in another aspect, a method for voice capture is disclosed. The method includes: (1) providing a voice enhanced reference signal, wherein the voice enhanced reference signal is based on a first frequency domain microphone signal and a second frequency domain microphone signal; (2) adjusting, via a noise beamformer adjustor, one or more filter weights of a voice rejected noise beamformer to account for fit variation; (3) generating, via the voice rejected noise beamformer, a noise reference signal based on the first frequency domain microphone signal and the second frequency domain microphone signal; (4) generating, via a jammer suppressor, a jammer suppressed signal based on the voice enhanced reference signal and the noise reference signal; and (5) generating, via a speech enhancer, an output voice signal based on the jammer suppressed signal, the noise reference signal, and a voice detection signal.

According to an example, the method may further include: (1) generating an SNR quality check signal based on the second frequency domain microphone signal; (2) generating, via a quality check voice activity detector, a voice detection quality check signal based on a frequency domain feedback microphone signal or the second frequency domain microphone signal; (3) storing, via a first data accumulator, first voice data corresponding to a relationship between the first frequency domain microphone signal and the second frequency domain microphone signal; (4) storing, via a second data accumulator, second voice data corresponding to an energy level of the first frequency domain microphone signal; and (5) dynamically updating, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

According to an example, the speech enhancer is configured to generate the output voice signal by: (1) determining a series of speech SNRs corresponding to a series of frequency bins based on the jammer suppressed signal and the noise reference signal; (2) comparing the speech SNRs of each frequency bin to a set of speech enhancer thresholds; and (3) applying a noise suppression signal to each frequency bin of the jammer suppressed signal, wherein an amplitude of the noise suppression signal applied to a frequency bin of the jammer suppressed signal is related to the SNR corresponding to the frequency bin.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

The present disclosure is generally directed to a voice capture system for a wearable audio device. Current voice capture systems utilize a noise reference signal generated by a delay and subtract beamformer based on audio captured by two or more microphones on the wearable audio device. The delay and subtract beamformer produces a cardioid polar pattern, with a null directed towards the wearer's mouth to remove speech audio from the noise reference signal. Accordingly, the delay and subtract beamformer may be considered a "nullformer." However, the direction of the nullformer depends on filter weights corresponding to the anticipated direction of the microphones on the wearable audio device. Therefore, if the wearable audio device is worn at an unanticipated angle, the null moves away from the user's mouth, causing speech audio to be incorporated into the noise reference signal, resulting in a degraded output signal. The degraded output signal may have artefacts resulting in the output voice signal sounding overly bassy and unnatural due to a loss of high frequency components. Further, speech articulation may be reduced, speech volume may be quieter, and more noise may leak through into the output signal. These issues can occur in fairly quiet environments, but are exacerbated in noisy environments.

The present disclosure detects variations in wearable audio device fit using signal-to-noise (SNR) ratio and voice activity detection based on audio captured by the microphones. The present disclosure further enhances clarity by dynamically suppressing noise in individual frequency bins of the output signal based on an analysis of the SNR of a voice reference signal compared to the noise reference signal at each frequency bin.

Figure 1:
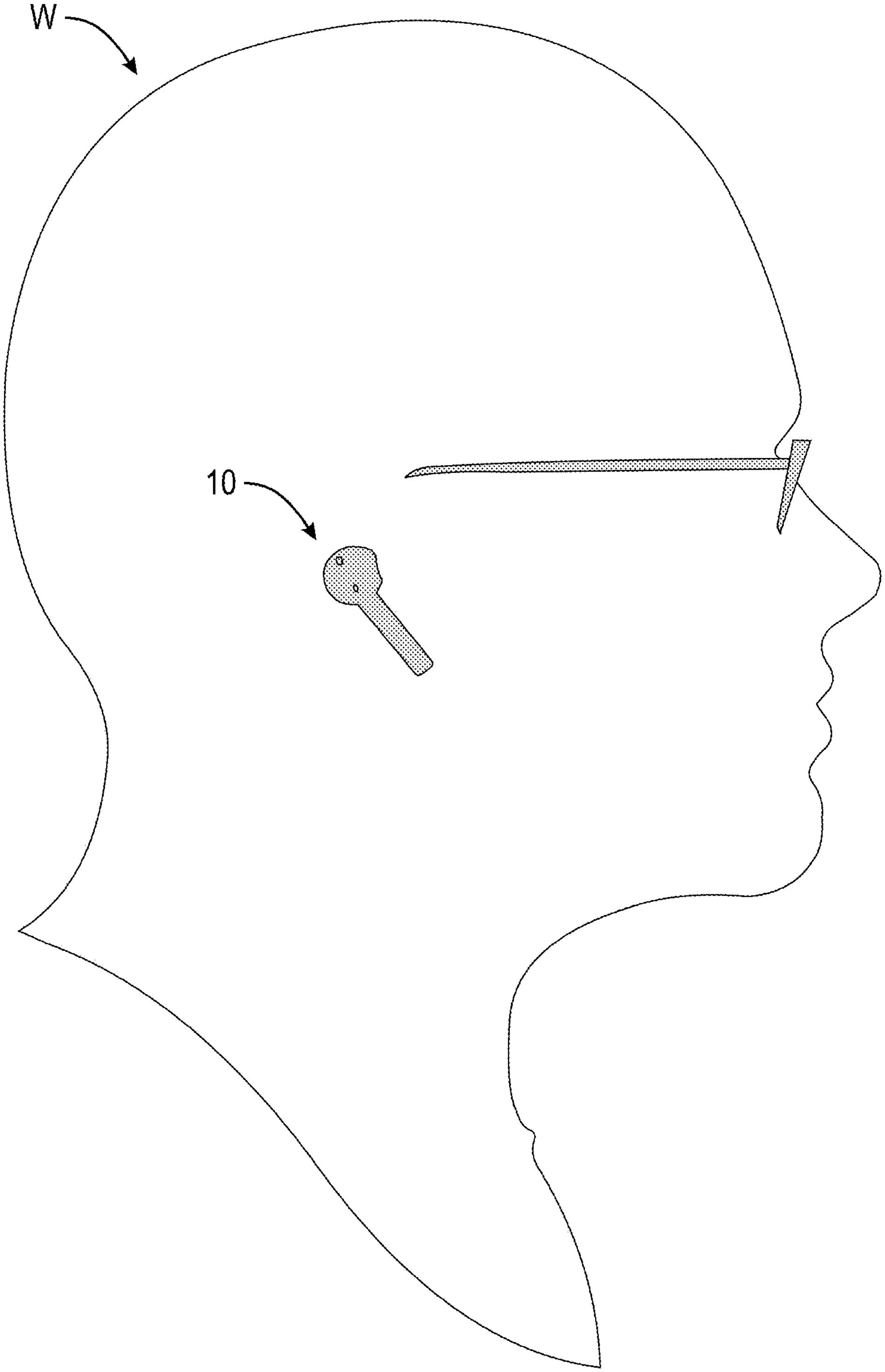
FIG. 1 illustrates a wearable audio device worn by a wearer, according to aspects of the present disclosure.

FIG. 1 illustrates a wearable audio device 10 worn by a wearer W. The wearable audio device 10 shown as a single-side in-ear earbud, but may also be an on-ear earbud, open-ear earbud, or an earcuff. In further examples, the wearable audio device 10 may be one earbud of a pair of double-side earbuds.

Figure 2:
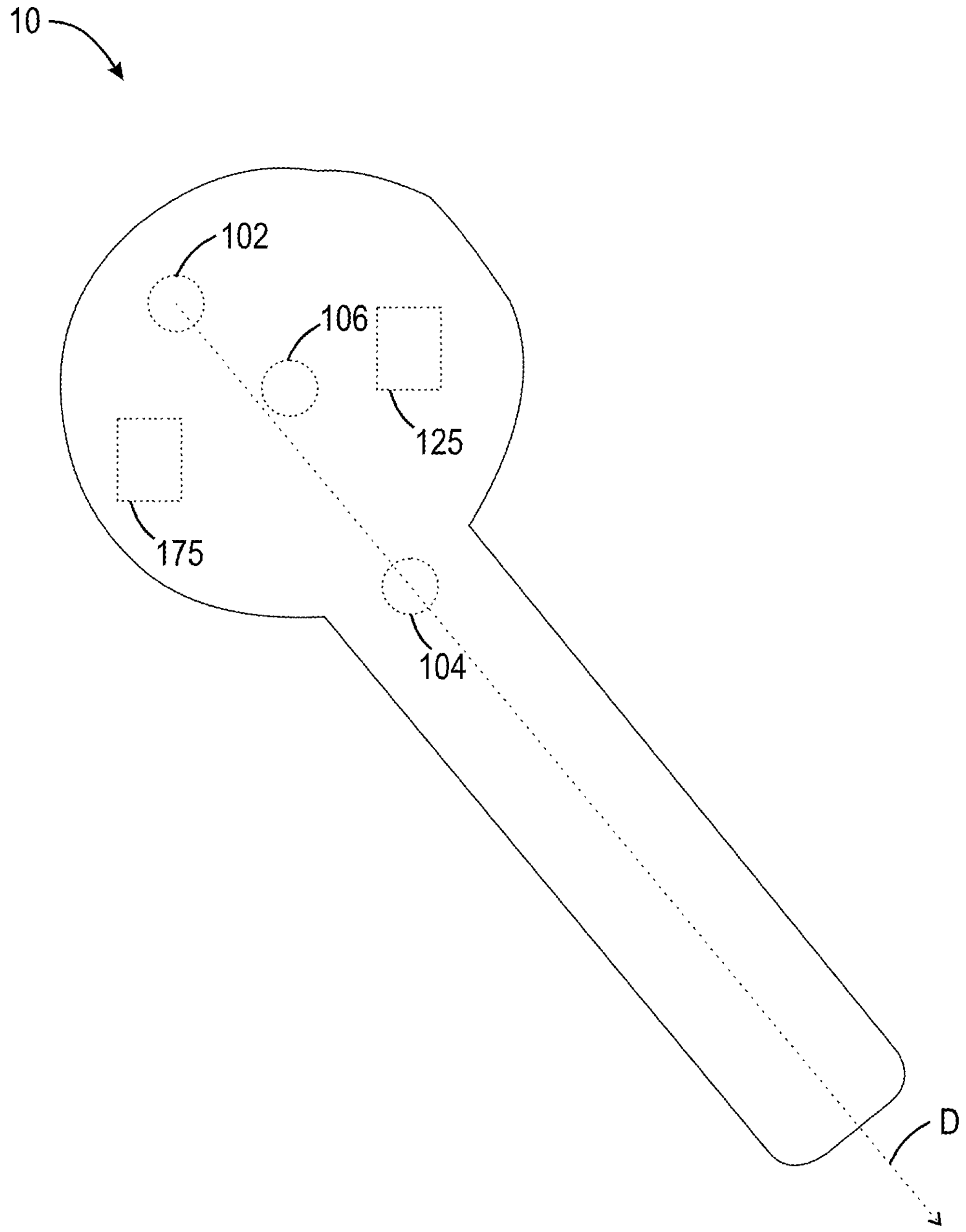
FIG. 2 illustrates a wearable audio device, according to aspects of the present disclosure.

The wearable audio device 10 of FIG. 1 is shown in more detail in FIG. 2. The wearable audio device 10 of FIG. 2 includes a first microphone 102, a second microphone 104, a processor 125, and a memory 175. In some examples, the first and second microphones 102, 104 are external microphones arranged on a surface of the wearable audio device 10. The first microphone 102 and the second microphone 104 are aligned in a direction D. As will be described in subsequent portions of the specification, the first microphone 102 and the second microphone 104 are configured to capture voice audio from the mouth of the wearer W. The processor 125 utilizes beamforming techniques to generate signals corresponding to the voice of the wearer W as well as environmental noise. Specifically, the wearable audio device 10 uses a delay and subtract noise beamformer 114 (see FIG. 6) to generate an accurate noise reference signal corresponding to the environmental noise. However, the delay and subtract noise beamformer 114 relies on filter weights 116 (see FIG. 7) programmed based on the anticipated direction D of the microphones 102, 104. Accordingly, if the wearer W varies the fit of the wearable device 10, the direction D of the first and second microphones 102, 104 will change, degrading the quality of the beamformed signals. Further, in some examples, the wearable audio device 10 also includes a feedback microphone 106. The feedback microphone 106 will be positioned near the ear canal of the wearer W to capture unwanted feedback sound travelling into the ear canal.

Figure 3A:
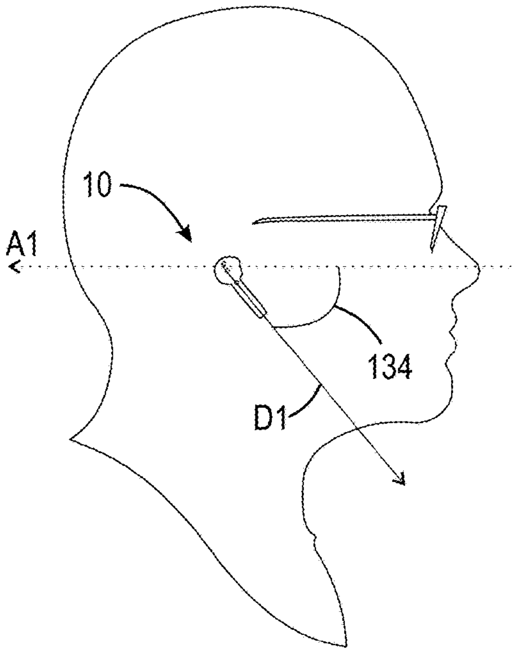
FIGS. 3A-3D illustrates the wearable audio device worn at a variety of angles, according to aspects of the present disclosure.

FIGS. 3A-3D illustrate fit variations of a wearable audio device 10 as a variety of microphone directions D1-D4 relative to a horizontal axis A1. In this context, fit variation describes changes in microphone direction D. The fit may vary from wearer-to-wearer, or a single wearer may vary the fit of their own wearable audio device 10. In FIG. 3A, D1 represents a stock voice direction described according to a bud rotation angle 134. A stock voice direction is preprogrammed by a manufacturer as the anticipated direction of the microphones 102, 104 when worn. The stock voice direction may be chosen based on a variety of factors, such as fitting studies, consumer surveys, and mechanical modeling. In some cases, the stock voice direction may be represented as a range of bud rotation angles 134, such as from 35 degrees to 40 degrees relative to the horizontal axis A1. Thus, the filter weights 116 (see FIG. 7) of the delay and subtract noise beamformer 114 (see FIG. 6) may be programmed according to this stock voice direction.

Figure 3B:
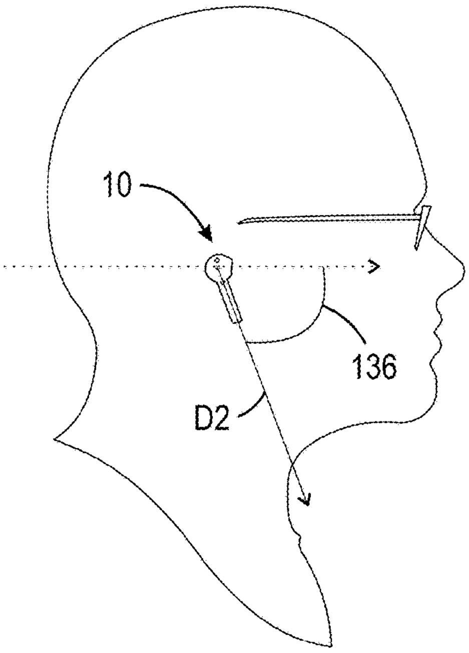
Figure 3C:
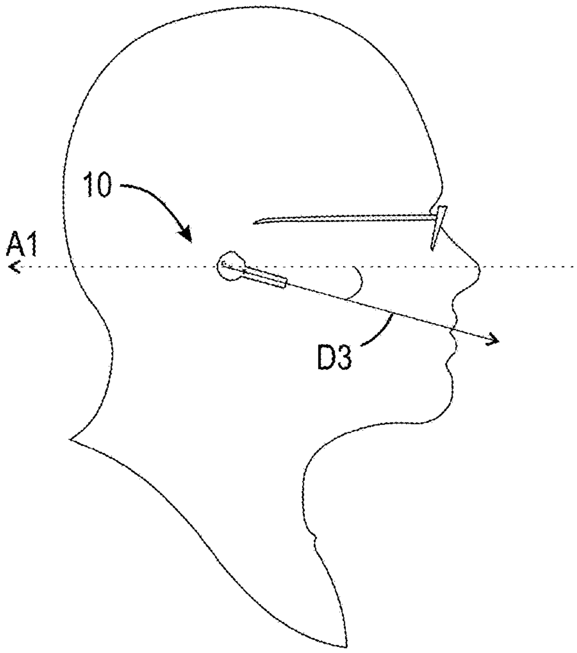
Figure 3D:
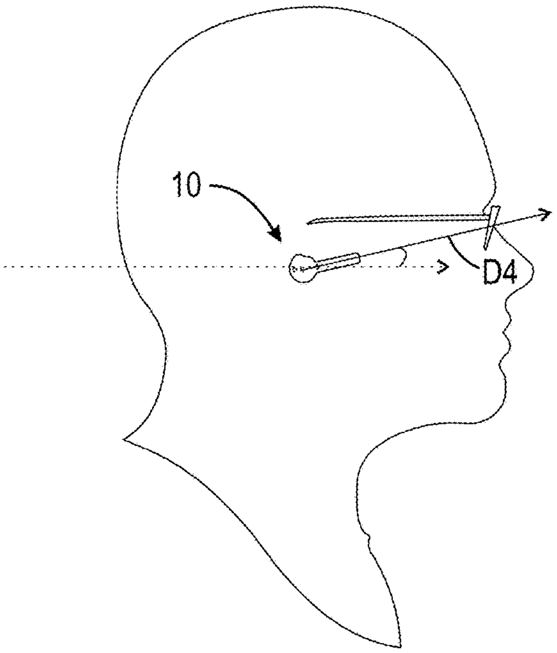

In FIG. 3B, D2 represents a wearer-specific voice direction D2 described according to bud rotation angle 136. In this case, while the anticipated fit for the wearable audio device 100 is shown in FIG. 3A, the wearer W may actually prefer the fit of FIG. 3B due to comfort or other preferences. In some cases, the user may be able to overwrite the stock voice direction with this wearer-specific voice direction. Accordingly, the filter weights (see FIG. 7) of the delay and subtract noise beamformer 114 (see FIG. 6) may be updated according to this wearer-specific voice direction. Further, FIGS. 3C and 3D show further possibilities of microphone directions D3, D4.

Figure 4A:
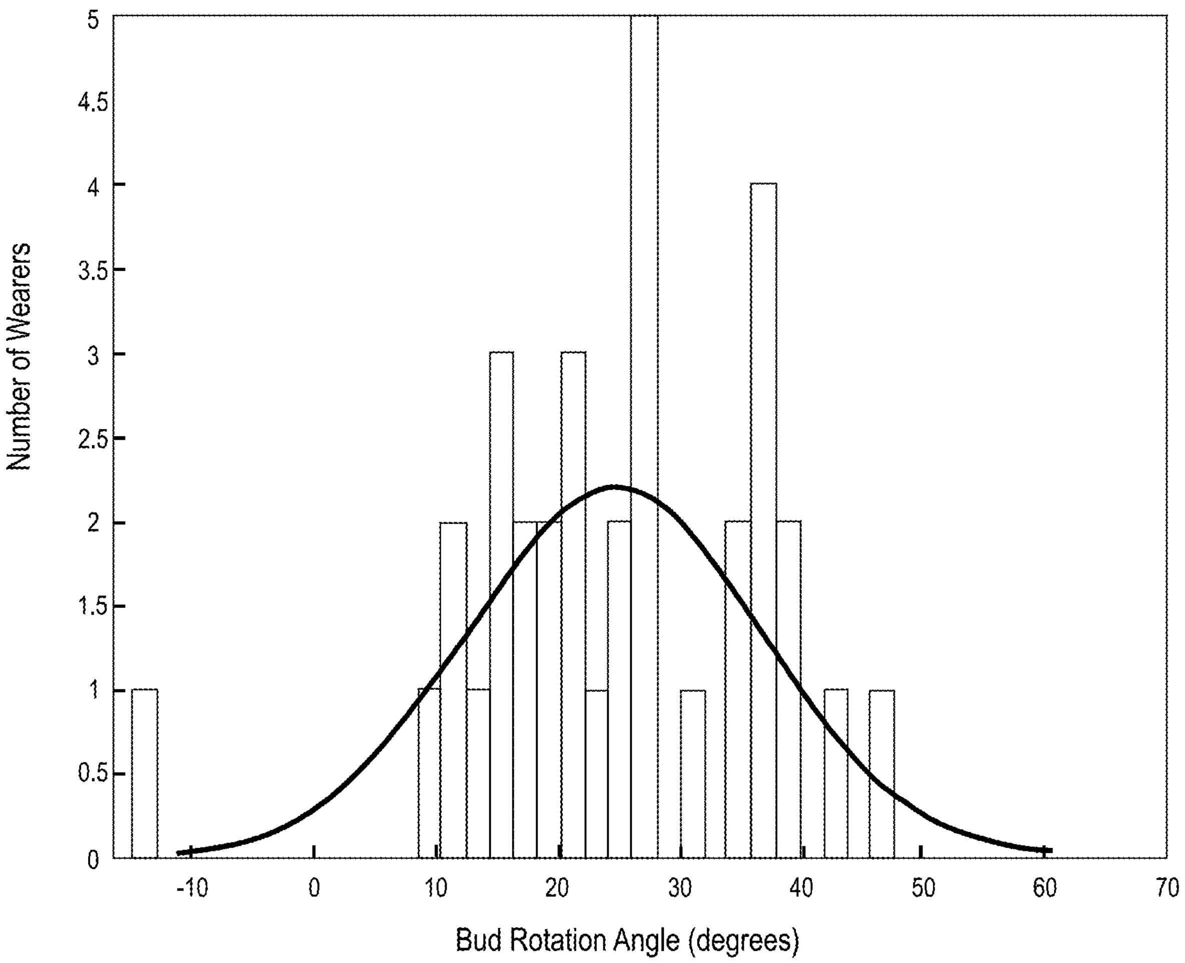
FIG. 4A is a histogram showing fit variation of an earbud, according to aspects of the present disclosure.
Figure 4B:
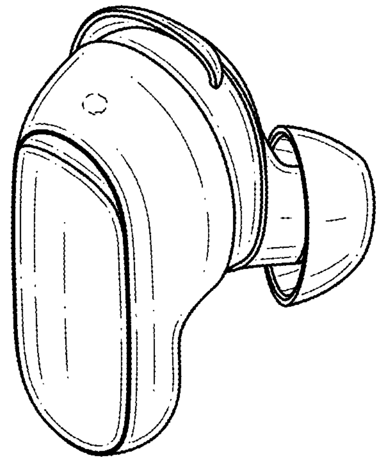
FIG. 4B is an isometric view of an earbud corresponding to the histogram of FIG. 4A, according to aspects of the present disclosure.
Figure 5A:
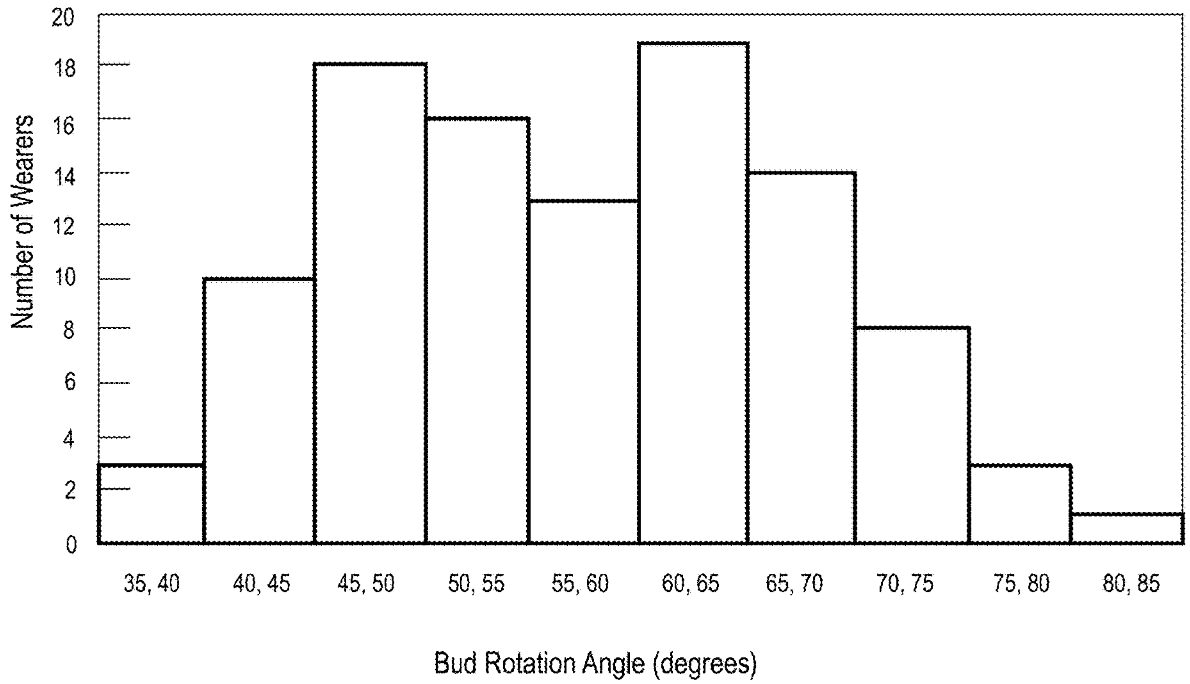
FIG. 5A is a further histogram showing fit variation of an earcuff, according to aspects of the present disclosure.
Figure 5B:
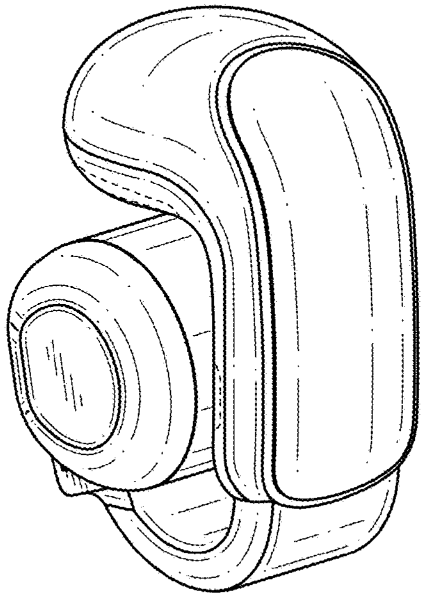
FIG. 5B is an isometric view of an earcuff corresponding to the histogram of FIG. 4A, according to aspects of the present disclosure.

FIGS. 4A and 5A are histograms of fit variation across a variety of wearers. FIG. 4A corresponds to an earbud, such as described in U.S. patent application Ser. No. 17/574,744, filed Jan. 13, 2022, shown in FIG. 4B. In FIG. 4A, thirty-four wearers have been surveyed for bud rotation angle. The histogram shows that the wearers range in bud rotation angle from −15 degrees to 47 degrees in a roughly Gaussian distribution, with bud rotations angle 27 degrees being the most prevalent. FIG. 5A corresponds to an earcuff, such as described in U.S. patent application Ser. No. 17/306,208, filed May 3, 2021, issued as U.S. Pat. No. 11,140,469, shown in FIG. 5B. In FIG. 5A, approximately one hundred wearers have been surveyed. FIG. 5A shows that the wearers range in bud rotation angle from thirty-five degrees to eighty-five degrees, with bud rotation angles between sixty and sixty-five degrees being the most prevalent. The histograms of FIGS. 4A and 5A illustrate the need for a voice capture system 100 which dynamically adjusts for fit variations resulting in unanticipated bud rotation angles. Accordingly, as demonstrated by FIGS. 4A and 5A, different types of wearable audio devices 10 may have different ranges of fit variation.

Figure 6:
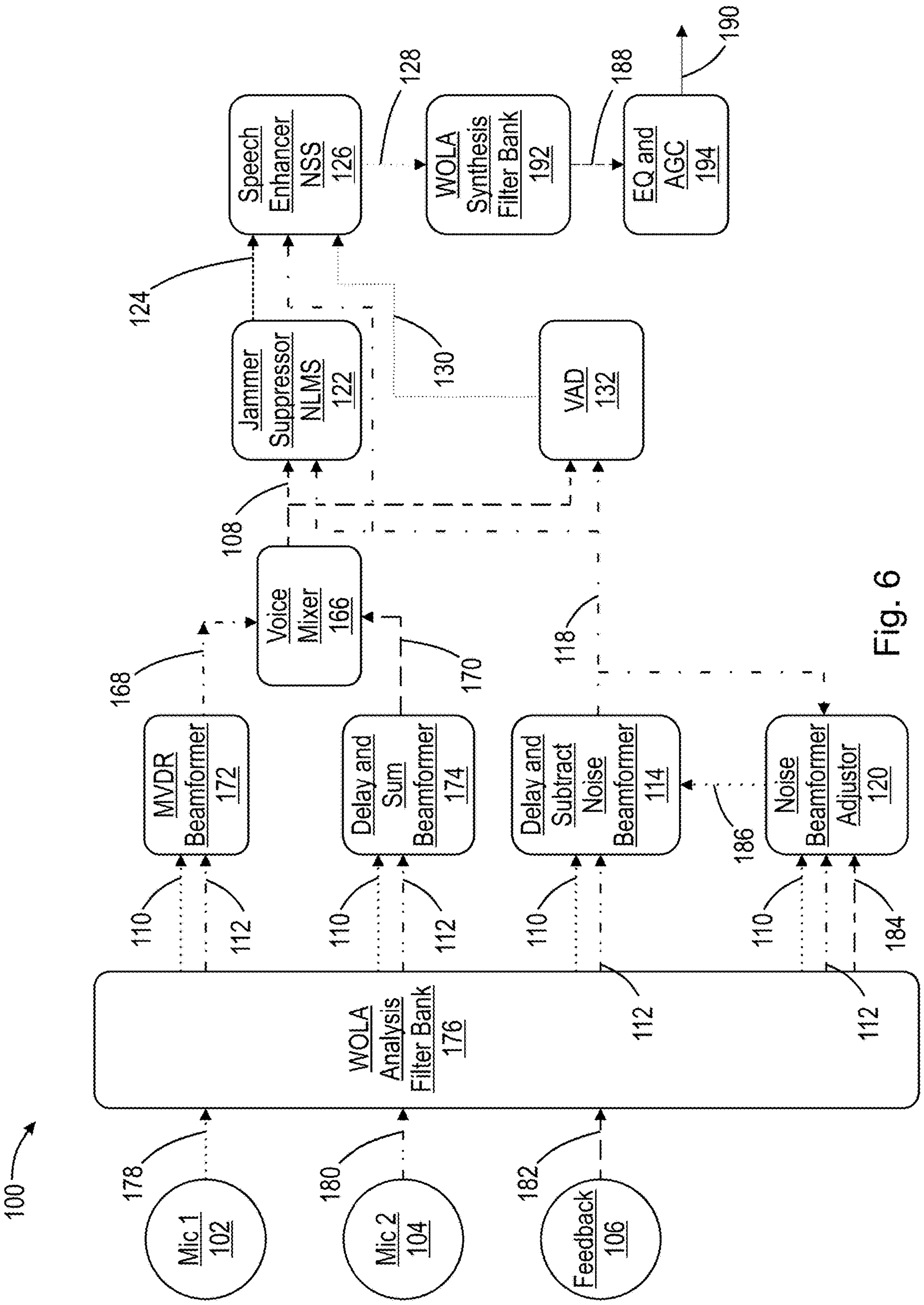
FIG. 6 is a functional block diagram of a voice capture system of a wearable audio device, according to aspects of the present disclosure.

FIG. 6 is a block diagram of a voice capture system 100. Aspects of the voice capture system 100 may be executed by processor 125 and/or stored in memory 175 (see FIG. 2). Generally, the voice capture system 100 may include a first microphone 102, a second microphone 104, a Weighted, Overlap, and Add (WOLA) analysis filter bank 176, a first voice beamformer 172, a second voice beamformer 174, a voice rejected noise beamformer 114, a noise beamformer adjustor 120, a voice mixer 166, a voice activity detector 132, a jammer suppressor 122, and a speech enhancer 126. In some examples, an output voice signal 128 generated by the speech enhancer 126 may be further processed by a WOLA synthesis filter bank 192 and an equalizer and automatic gain control (AGC) 194. In some further examples, a feedback microphone 106 is used. In even further examples, the first and second microphones 102, 104 may be replaced by a microphone array comprising three or more microphones. In some examples, the feedback microphone 106 may be more sensitive to speech audio than the first or second microphone 102, 104.

As used herein, the term “beamformer” generally refers to a filter or filter array used to achieve directional signal transmission or reception. In the examples described in the present application, the beamformers combine audio signals received by multiple audio sensors (such as microphones) to focus on a desired spatial region, such as the region around the wearer’s mouth. While different types of beamformers utilize different types of filtering, beamformers generally achieve directional reception by filtering the received signals such that, when combined, the signals received from the desired spatial region constructively interfere, while the signals received from the undesired spatial region destructively interfere. This interference results in an amplification of the signals from the desired spatial region, and rejection of the signals from the undesired spatial region. The desired constructive and destructive interference is generally achieved by controlling the phase and/or relative amplitude of the received signals before combining. The filtering may be implemented via one or more integrated circuit (IC) chips, such as a field-programmable gate array (FPGA). The filtering may also be implemented using software.

In the example of FIG. 6, the first microphone 102 and the second microphone 104 each capture noisy audio and generate a first time domain microphone signal 178 and a second time domain microphone signal 180, respectively. The first time domain microphone signal 178 and the second time domain microphone signal 180 are converted into a first frequency domain microphone signal 110 and a second frequency domain microphone signal 112 by the WOLA analysis filter bank 176 via frame-by-frame analysis. If a feedback microphone 106 is used, the WOLA analysis filter bank 176 converts a time domain feedback microphone signal 182 into a frequency domain feedback microphone signal 184.

The first frequency domain microphone signal 110 and the second frequency domain microphone signal 112 are then processed by the various beamformers of the voice capture system 100. The first voice beamformer 172 uses the first and second frequency domain microphone signals 110, 112 to generate a first voice beamformer signal 168. In the example of FIG. 6, the first voice beamformer 172 is a minimum variance distortionless response (MVDR) beamformer. The algorithm employed by the MVDR beamformer minimizes the power of the noise captured by the first and second microphones 102, 104 while keeping the desired signal distortionless. In doing so, MVDR beamformers can provide improved SNR performance over other beamformers (such as delay and sum beamformers) in diffused noise environments, such as a cafeteria-type setting. However, in certain environments, such as high wind environments, MVDR beamformers may amplify noise instances as much as 10 to 20 dB at certain frequencies, thus negatively impacting SNR performance of resultant beamformed signals.

The second voice beamformer 174 uses the first and second frequency domain microphone signals 110, 112 to generate a second voice beamformer signal 170. In the example of FIG. 6, the second voice beamformer 174 is a delay and sum beamformer. In this example, the delay and sum beamformer provides improved performance (over the MVDR beamformer) in windy conditions.

The first and second voice beamformer signals 168, 170 are provided to a voice mixer 166. The voice mixer 166 is configured to dynamically mix the first and second voice beamformer signals 168, 170 to generate a voice enhanced reference signal 108. The voice mixer 166 may dynamically adjust the blend of the first and second voice beamformer signals 168, 170 based on a variety of factors, including amplitude of the first and second voice beamformer signals 168, 170, to reduce diffused acoustical and wind noise in the voice enhanced reference signal 108. For example, in windy conditions, the voice mixer 166 may include a higher amount of the second voice beamformer signal 170 from the delay and sum beamformer.

Figure 7:
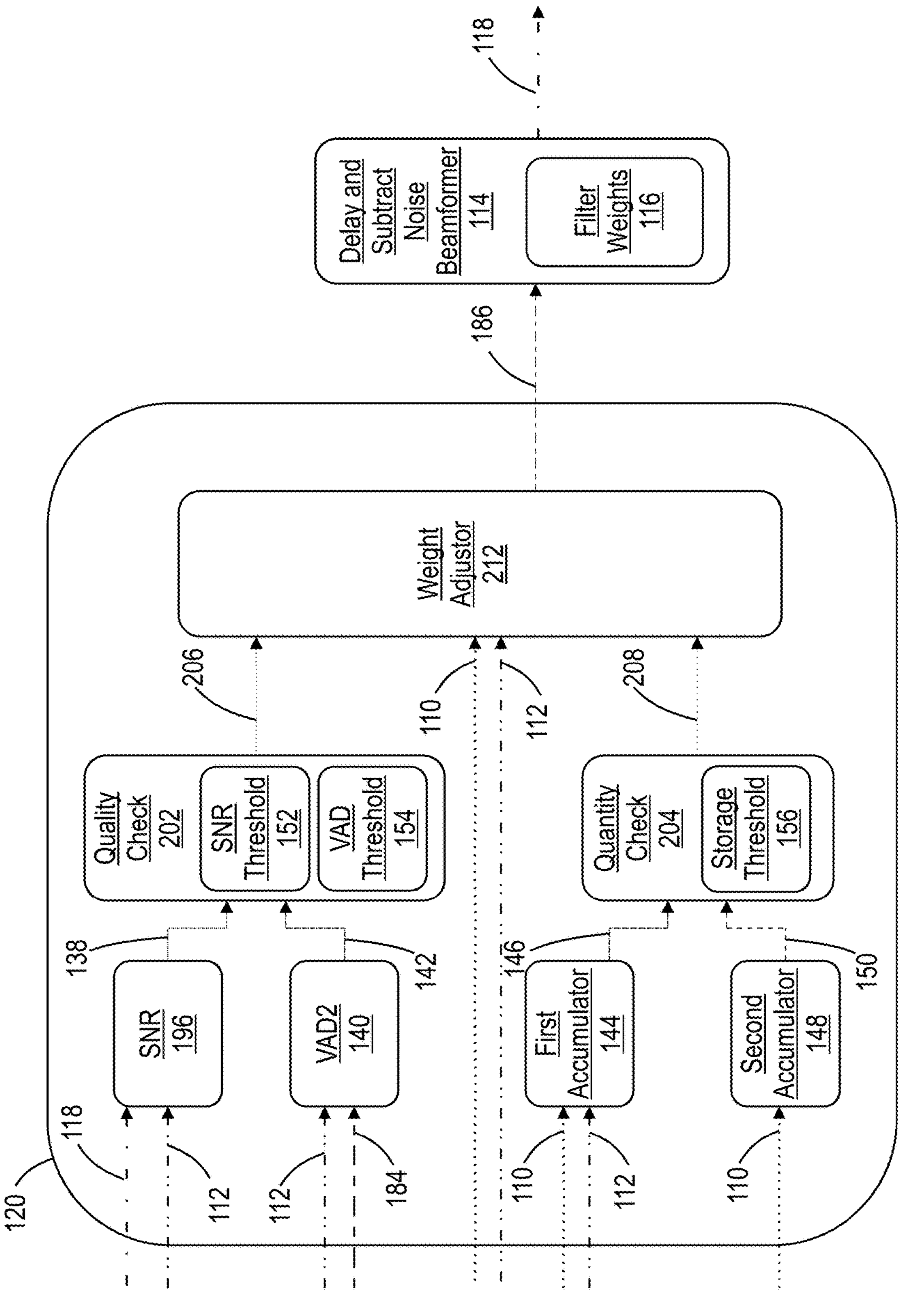
FIG. 7 is a functional block diagram of a noise beamformer adjustor of the voice capture system, according to aspects of the present disclosure.

Further, the first and second frequency domain microphone signals 110, 112 are provided to the voice rejected noise beamformer 114 to generate a noise reference signal 118. In some examples, the voice rejected noise beamformer 114 is a Wiener delay and subtract beamformer comprising a plurality of filter weights 116 (see FIG. 7). The voice rejected noise beamformer 114 acts as a nullformer to generate a signal representing noise without the wearer's voice audio by forming a null pattern around the location of the wearer's mouth. The location of the null pattern is configured based on the filter weights 116. In some examples, the filter weights 116 correspond to a stock voice direction assigned during manufacturing, such as the direction shown in FIG. 3A. In other examples, the filter weights 116 correspond to a user-specific voice direction, such as the direction shown in FIG. 3B. In either case, if the filter weights 116 no longer correspond to the current fit of the wearable audio device 10, the noise beamformer adjustor 120 updates the filter weights 116 as shown in FIG. 7.

The jammer suppressor 122 receives the voice enhanced reference signal 108 (generated by the voice mixer 166) and the noise reference signal 118 (generated by the voice rejected noise beamformer 114) to generate a jammer suppressed signal 124. The jammer suppressor 122 may be a normalized least-mean square (NLMS)-based adaptive beamformer configured to reject discrete noise instances.

The speech enhancer 126 receives the jammer suppressed signal 124 and the noise reference signal 118 to generate an output voice signal 128. The speech enhancer 126 may be a noise spectral subtraction (NSS) adaptive beamformer configured to reduce diffuse noise. As will be described in greater detail with reference to FIG. 8, the speech enhancer 126 may be configured to further enhance clarity by dynamically suppressing noise in individual frequency bins of the jammer suppressed signal 124 based on an SNR analysis of the jammer suppressed signal 124 and the noise reference signal 118 at each frequency bin.

Further, the speech enhancer 126 receives a voice detection signal 130 from a voice activity detector 132. The voice activity detector 132 determines if the wearer is speaking based on the voice enhanced reference signal 108 and the voice rejected noise reference signal 118. If the wearer is speaking, the voice detection signal 130 prevents adaptation of the speech enhancer 126 to prevent the accidental cancellation of speech audio. The voice detection signal 130 may be a binary signal (such as a flag) indicating the presence or lack of presence of speech.

Once the output voice signal 128 is generated by the speech enhancer 126, the voice capture system 100 may further process the output voice signal 128 via a WOLA synthesis filter bank 192 and an equalizer and AGC 194. The WOLA synthesis filter bank 192 converts the output voice signal 128 into an output time domain voice signal 188. The equalizer may then attenuate the output time domain voice signal 188 at certain frequencies (or certain frequency bins), while the AGC may amplify the signal at certain frequencies (or certain frequency bins) according to system 100 requirements to generate an equalized and amplified output voice signal 190. The equalized and amplified output voice signal 190 may then be sent to additional circuitry for transmission to a remote listener (e.g., a participant to a voice call) for transduction to acoustic energy on the far end and/or to a remote server, such as a virtual personal assistant (VPA), e.g., Amazon Alexa or Apple Siri, for analysis.

In further examples, the output time domain voice signal 188 or the equalized and amplified output voice signal 190 may be used to provide a sidetone to the wearer W. In these examples, the output time domain voice signal 188 or the equalized and amplified output voice signal 190 may be transduced to acoustic energy by an electroacoustic transducer disposed in the wearable audio device 10. A sidetone may be defined as audible feedback provided to the wearer W confirming proper operation of the wearable audio device 10. This audible feedback includes a small amount of the voice of the wearer W. Hearing this audible feedback allows the wearer W to confirm that the microphones 102, 104 of the wearable audio device 10 are operating properly, adjust their speaking level to an appropriate level, and/or confirm connectivity of a voice call or other connection. The use of sidetones may also provide additional benefits to the wearer W, such as increasing environmental audio transparency and enabling the wearer W to speak in a more natural voice.

FIG. 7 is a functional block diagram of the noise beamformer adjustor 120 of the voice capture system. The noise beamformer adjustor 120 utilizes the data captured by the first and second microphones 102, 104 (and optionally the feedback microphone 106) to dynamically adjust or update the filter weights 116 of the voice rejected noise beamformer 114. In this way, the filter weights 116 are adjusted to compensate for the variations in the fit of the wearable audio device 10 as shown in FIGS. 3A-3D. As shown in FIG. 7, the noise beamformer adjustor 120 analyzes both the quality and quantity of captured data before updating the filter weights 116. In particular, the filter weights 116 are only updated if the wearer is speaking, there is a low level of interference (from others talking, wind noise, or other environmental noise), and sufficient speech-related data has been captured.

First, regarding the quality check, a quality check SNR analyzer 196 generates an SNR quality check signal 138 based on the second frequency domain microphone signal 112 and the current noise reference signal 118. The SNR quality check signal 138 represents the SNR of the second frequency domain microphone signal 112. The SNR is determined based on a fast exponential average of the second frequency domain microphone signal 112 and a slow exponential average of the noise reference signal 118.

Second, the quality check voice activity detector 140 analyzes either the second frequency domain microphone signal 112 or the frequency domain feedback microphone signal 184 for the presence of voice or speech activity. The quality check voice activity detector 140 generates a voice detection quality check signal 142 representing the presence (or lack of presence) of voice or speech activity.

A quality checker 202 receives both the SNR quality check signal 138 and the voice detection quality check signal 142. The quality checker 202 utilizes a pair of thresholds to determine if the captured data is of sufficient quality to update the filter weights 116 of the voice rejected noise beamformer 114. If the SNR quality check signal 138 exceeds the SNR quality check threshold 152 and the voice detection quality check signal 142 exceeds the voice detection quality threshold 154, a quality check signal 206 is generated indicating the captured data is of sufficient quality to update the filter weights 116.

Third, regarding the quantity check, a first data accumulator 144 receives the first and second frequency domain microphone signals 110, 112. The first data accumulator 144 then stores first voice data 146. The first voice data 146 represents a relationship between the first and second frequency domain microphone signals 110, 112. In one example, this relationship is an average cross power signal between the first and second frequency domain microphone signals 110, 112.

Fourth, a second data accumulator 148 receives the first frequency domain microphone signal 110. The second data accumulator 148 then stores second voice data 150 corresponding to one or more energy levels of the first frequency domain microphone signal 110. In one example, this energy level is an average autopower of the first frequency domain microphone signal 110.

A quantity checker 204 then analyzes the first voice data 144 and the second voice data 150 against one or more storage thresholds 156 to determine if sufficient data has been captured to adjust the filter weights 116 of the voice rejected noise beamformer 114. If so, quantity check signal 208 is generated indicating sufficient data has been captured to update the filter weights 116. In some examples, the quantity check signal 208 relates to the coherence between the first and second frequency domain microphone signals 110, 112. In an example, the storage threshold 156 may be one thousand blocks of data (or four seconds in the time domain).

The noise beamformer adjustor 120 also includes a weight adjustor 212. The weight adjustor 212 is configured to receive the quality check signal 206, the quantity check signal 208, and the first and second frequency domain microphone signals 110, 112. If the quality and quantity check signals 206, 208 indicate the captured data is of sufficient quality and quantity to adjust the filter weights 116 of the voice rejected noise beamformer 114, the weight adjustor 212 generates a weight adjustment signal 186. The weight adjustment signal 186 may be generated based on the first and second frequency domain microphone signals 110, 112, as well as on one or more relationships between the first and second frequency domain microphone signals 110, 112. The weight adjustment signal 186 is then provided to the voice rejected noise beamformer 114 which adjusts the filter weights 116 accordingly. In one example, the weight adjustment signal 186 may be based on autocorrelation and/or cross-correlation of the first and second frequency domain microphone signals 110, 112. In some examples, the weight adjustment signal 186 may be based on a ratio of the first voice data 146 to the second voice data 150 (or vice versa).

Figure 8:
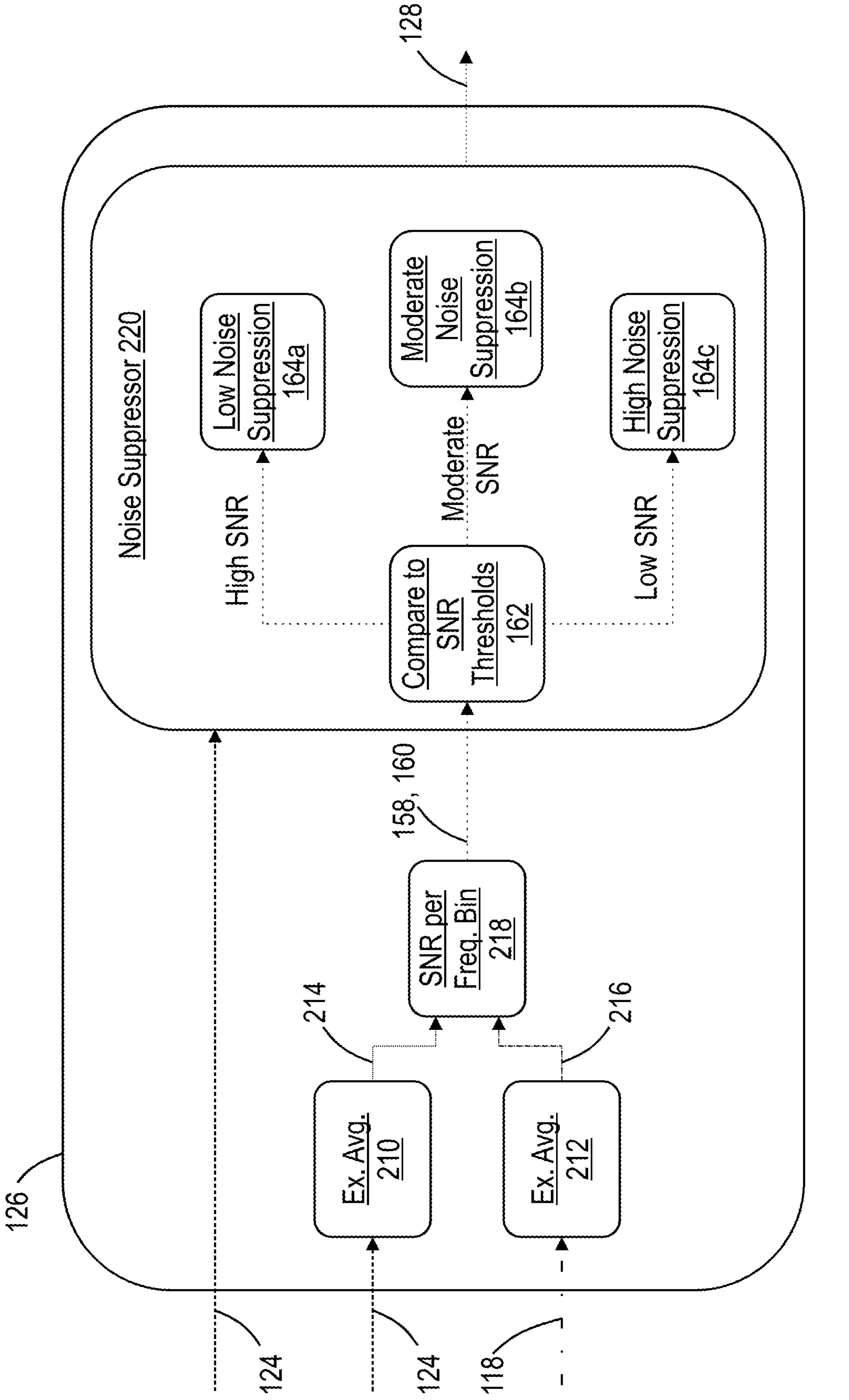
FIG. 8 is a functional block diagram of a speech enhancer of the voice capture system, according to aspects of the present disclosure.

FIG. 8 is a functional block diagram of a speech enhancer 126 of the voice capture system 100. The speech enhancer 126 further clarifies the output voice signal 128 by dynamically suppressing noise in individual frequency bins 160 of the output voice signal 128 based on an analysis of the SNR 158 of the jammer suppressed signal 124 compared to the noise reference signal 118 at each frequency bin 160. Implementing the speech enhancer 126 as shown in FIG. 8 may reduce noise by up to 20 dB.

As shown in FIG. 8, the speech enhancer 126 receives the jammer suppressed signal 124 generated by the jammer suppressor 122 (see FIG. 6) and the noise reference signal 118 generated by the voice rejected noise beamformer 114 (see FIGS. 6 and 7). A speech exponential averager 210 generates a speech power 214 signal based on the jammer suppressed signal 124 in a fast fashion (fast exponential averaging), while a noise exponential averager 212 generates a noise power signal 216 based on the noise reference signal 118 in a slow fashion (slow exponential averaging). An SNR analyzer 218 then generates SNRs 158 for each frequency bin 160 of the jammer suppressed signal 124.

A noise suppressor 220 of the speech enhancer 126 then receives the jammer suppressed signal 124 and the SNRs 158 of each frequency bin 160. The noise suppressor 220 applies a noise suppression signal 164 to the jammer suppressed signal 124 to reduce diffuse noise of the voice output signal 128. The noise suppressor 124 dynamically adjusts the amplitude of the noise suppression signal 164 at each frequency bin 160 based on the comparison of the SNRs 158 to one or more SNR thresholds 162. For example, if the SNR **158*a* of a first frequency bin 160*a* is determined to be relatively high, a low amplitude noise suppression signal 164*a* is applied to the first frequency bin 160*a* of the jammer suppressed signal 124. Further, if the SNR 158*b* of a second frequency bin 160*b* is determined to be relatively moderate, a moderate amplitude noise suppression signal 164*b* is applied to the second frequency bin 160*b* of the jammer suppressed signal 124. Additionally, if the SNR 158*c* of a third frequency bin 160*c* is determined to be relatively low, a high amplitude noise suppression signal 164*c* is applied to the third frequency bin 160*c* of the jammer suppressed signal 124. In other examples, more than three different thresholds 162** and amplitude levels may be used for more precise noise suppression.

Figure 9A:
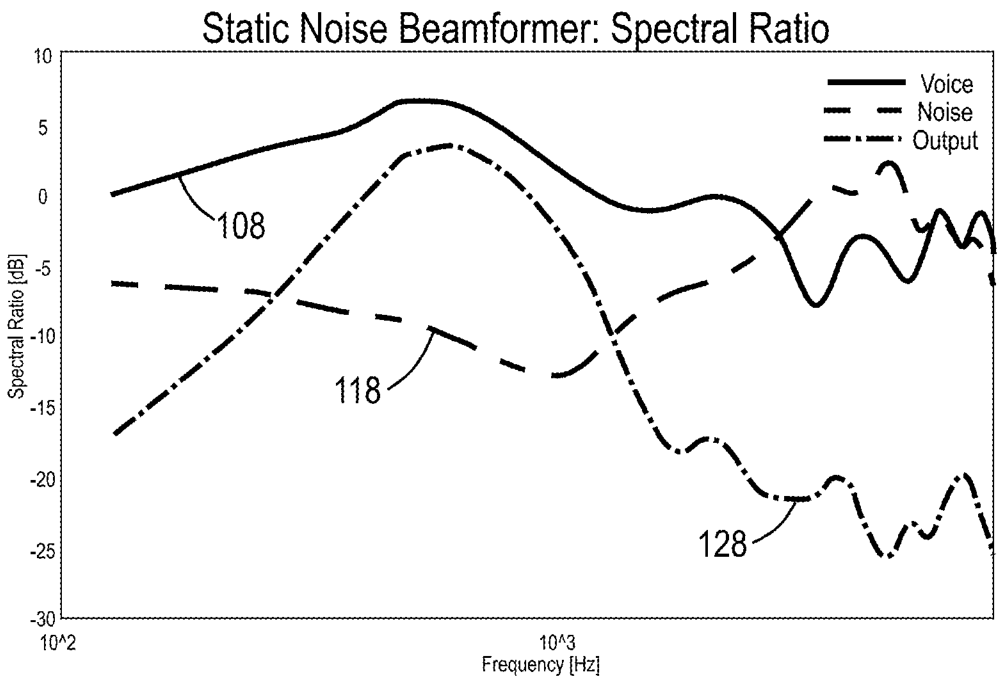
FIGS. 9A and 9B are graphs showing the spectral ratio of various aspects of the voice capture system, according to aspects of the present disclosure.
Figure 9B:
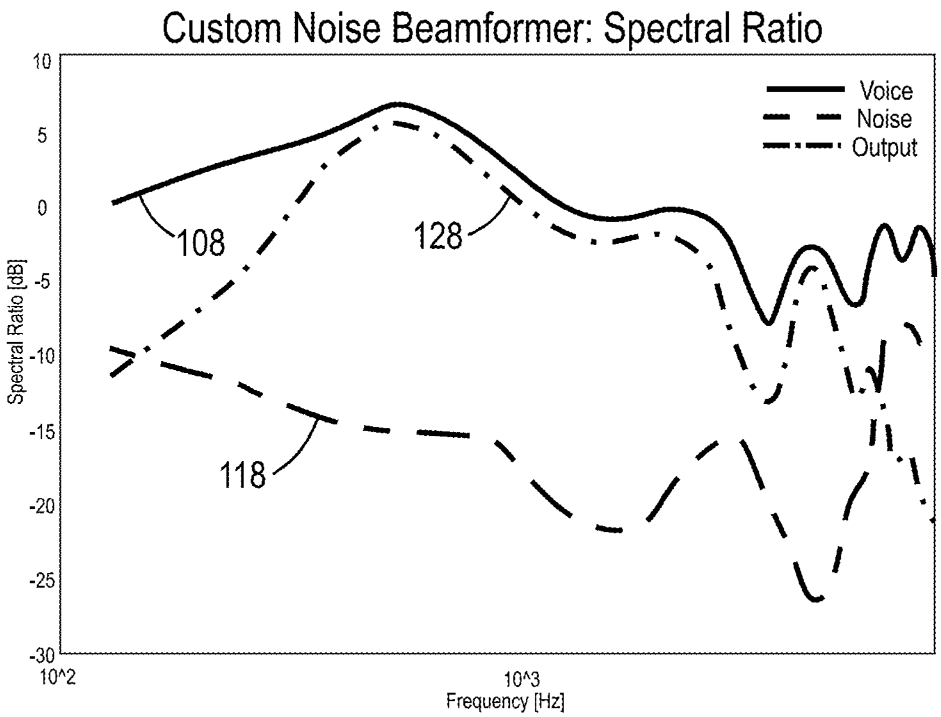

FIGS. 9A and 9B are graphs showing the spectral ratio of various aspects of the voice capture system 100. In particular, FIGS. 9A and 9B illustrate the spectral ratio of the voice enhanced reference signal 108 from the voice mixer 166, the noise reference signal 118 from the voice rejected noise beamformer 114, and the output voice signal 128 from the speech enhancer 126. FIG. 9A shows the spectral ratios without the filter weight 116 adjustment described with reference to FIG. 7, while FIG. 9B shows the spectral ratios with the dynamic filter weight adjustment 116. As can be seen, the dynamic adjustment of the filter weights results in a more powerful output voice signal 128 at most frequencies, as well as a lower noise reference signal 118 at most frequencies. Accordingly, as the noise reference signal 118 is lower, more noise is removed from the output voice signal 128 of FIG. 9B.

Figure 10:
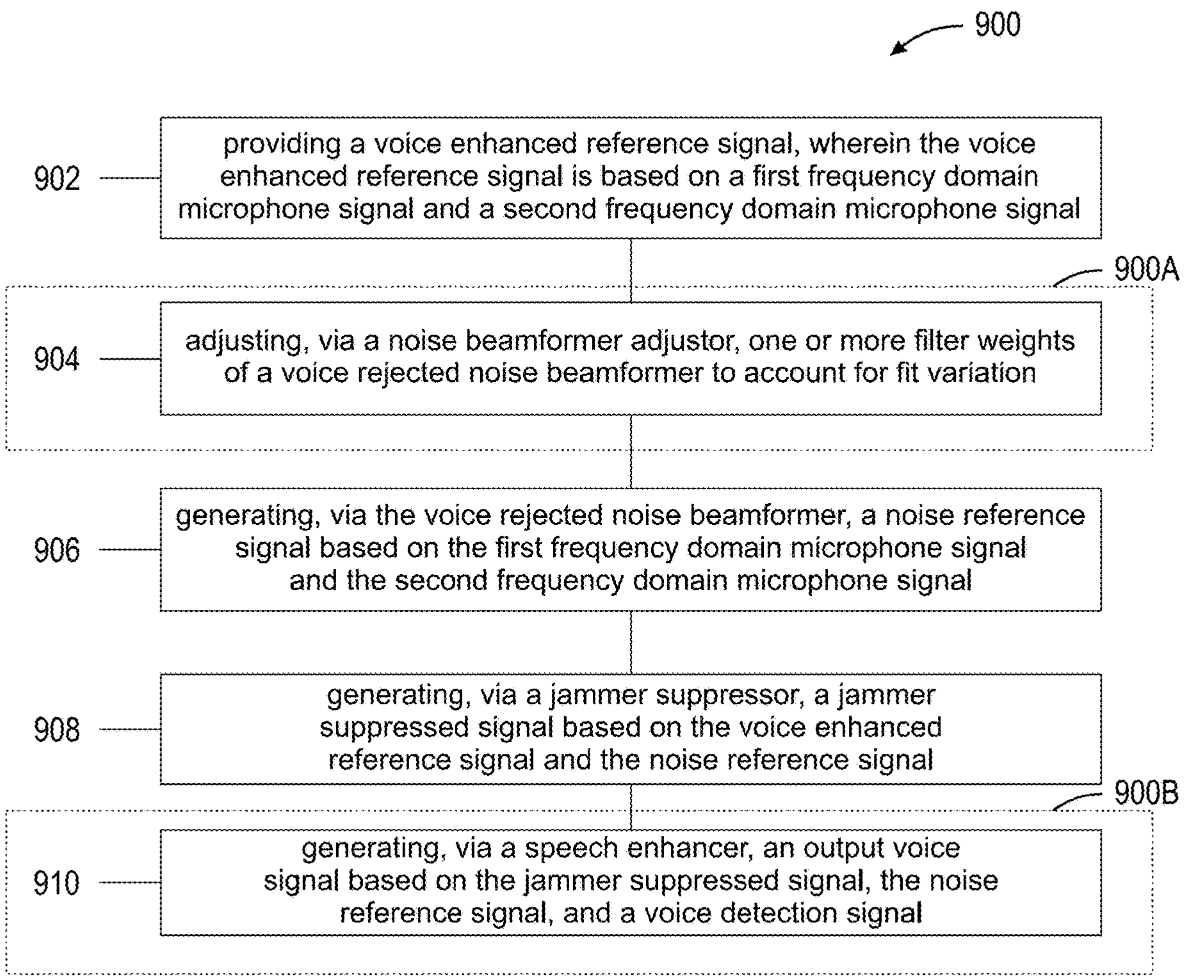
FIG. 10 is a flowchart of a method for voice capture, according to aspects of the present disclosure.

FIG. 10 is a flowchart of a method 900 for voice capture. The method 900 includes: (1) providing 902 a voice enhanced reference signal, wherein the voice enhanced reference signal is based on a first frequency domain microphone signal and a second frequency domain microphone signal; (2) adjusting 904, via a noise beamformer adjustor, one or more filter weights of a voice rejected noise beamformer to account for fit variation; (3) generating 906, via the voice rejected noise beamformer, a noise reference signal based on the first frequency domain microphone signal and the second frequency domain microphone signal; (4) generating 908, via a jammer suppressor, a jammer suppressed signal based on the voice enhanced reference signal and the noise reference signal; and (5) generating 910, via a speech enhancer, an output voice signal based on the jammer suppressed signal, the noise reference signal, and a voice detection signal.

Figure 11:
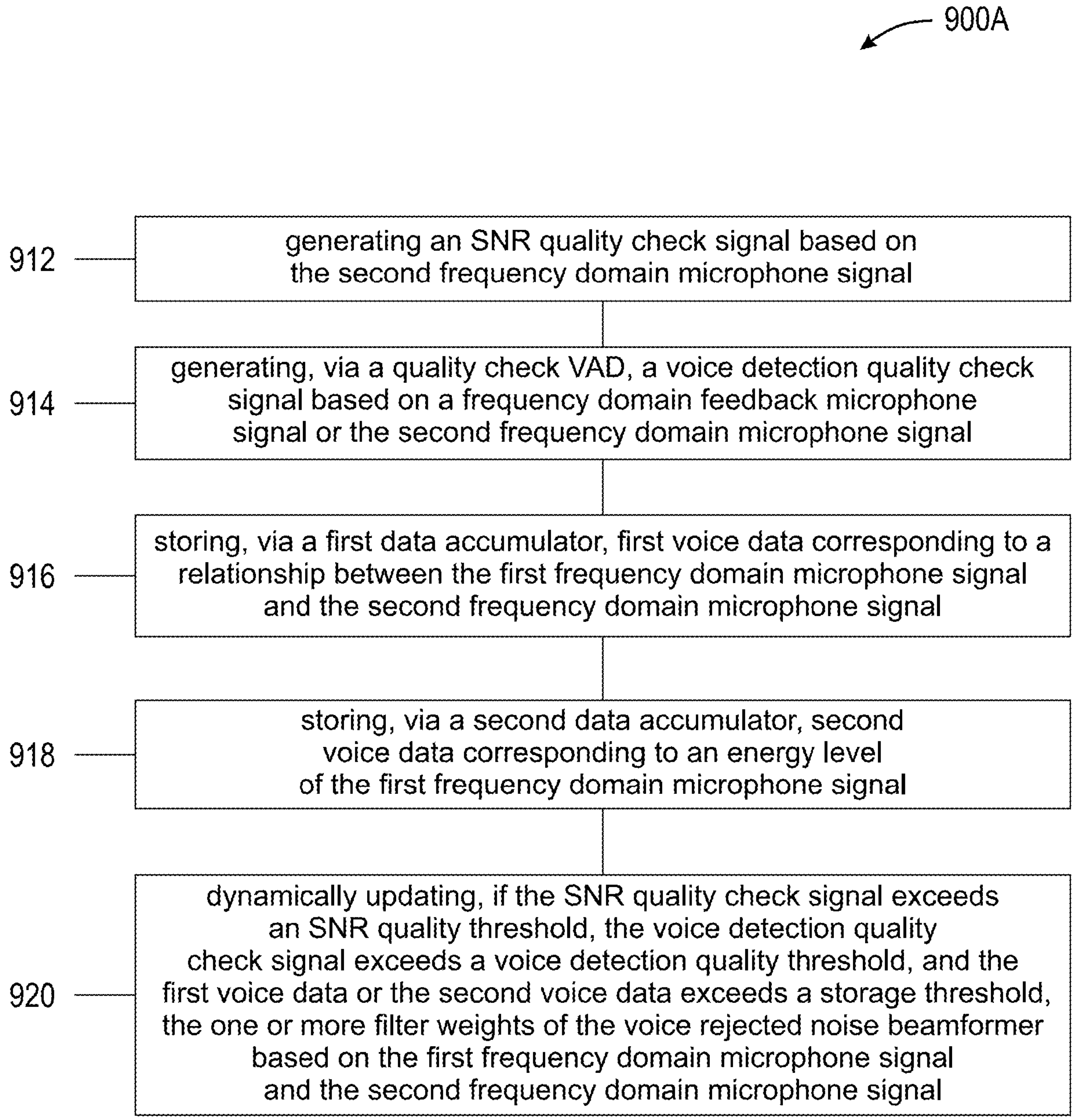
FIG. 11 is a further flowchart of the method for voice capture, according to aspects of the present disclosure.

FIG. 11 is a further flowchart of the method 900 for voice capture. In particular, FIG. 11 includes steps for adjusting 904 the filter weights of the voice rejected noise beamformer via the noise beamformer adjustor. This method 900A may include: (1) generating 912 an SNR quality check signal based on the second frequency domain microphone signal; (2) generating 914, via a quality check voice activity detector, a voice detection quality check signal based on a frequency domain feedback microphone signal or the second frequency domain microphone signal; (3) storing 916, via a first data accumulator, first voice data corresponding to a relationship between the first frequency domain microphone signal and the second frequency domain microphone signal; (4) storing 918, via a second data accumulator, second voice data corresponding to an energy level of the first frequency domain microphone signal; and (5) dynamically updating 920, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

Figure 12:
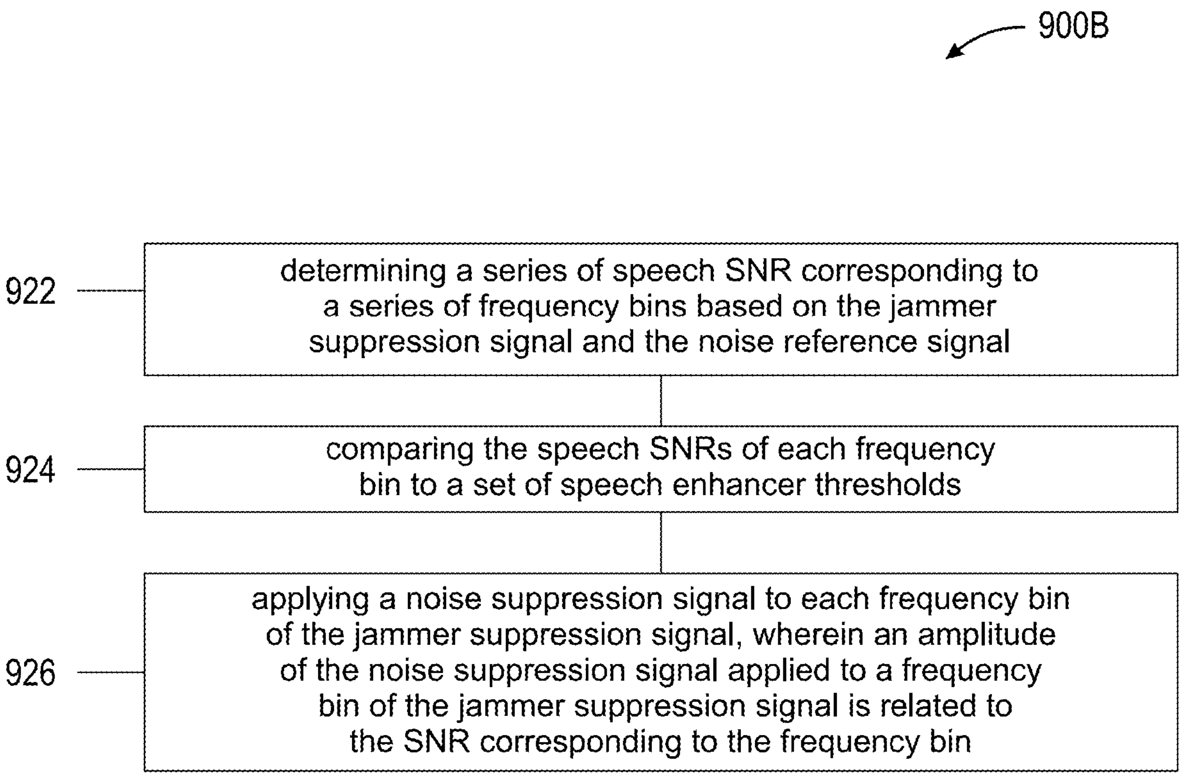
FIG. 12 is an additional flowchart of the method for voice capture, according to aspects of the present disclosure.

FIG. 12 is an additional flowchart of the method 900 for voice capture. In particular, FIG. 12 includes steps for generating 910 the output voice signal via the speech enhancer. The speech enhancer is configured to generate the output voice signal by: (1) determining 922 a series of speech signal-to-noise ratios (SNR) corresponding to a series of frequency bins based on the jammer suppressed signal and the noise reference signal; (2) comparing 924 the speech SNRs of each frequency bin to a set of speech enhancer thresholds; and (3) applying 926 a noise suppression signal to each frequency bin of the jammer suppressed signal, wherein an amplitude of the noise suppression signal applied to a frequency bin of the jammer suppressed signal is related to the SNR corresponding to the frequency bin.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A voice capture system, comprising:

a minimum variance distortionless response (MVDR) beamformer configured to generate a first voice beamformer signal based on a first frequency domain microphone signal and a second frequency domain microphone signal;

a delay and sum beamformer configured to generate a second voice beamformer signal based on the first frequency domain microphone signal and the second frequency domain microphone signal;

a voice mixer configured to blend the first voice beamformer signal with the second voice beamformer signal to generate a voice enhanced reference signal, wherein an amount of the first beamformer signal as compared to the second beamformer signal in the voice enhanced reference signal is dynamically adjusted based on amplitudes of the first and the second beamformer signals;

a voice rejected noise beamformer comprising one or more filter weights, the voice rejected noise beamformer configured to generate a noise reference signal based on the first frequency domain microphone signal and the second frequency domain microphone signal;

noise beamformer adjustor configured to adjust the one or more filter weights of the voice rejected noise beamformer to account for fit variation, wherein the filter weights are adjusted based on the first frequency domain microphone signal, the second frequency domain microphone signal, and the noise reference signal;

a jammer suppressor configured to generate a jammer suppressed signal based on the voice enhanced reference signal and the noise reference signal; and a speech enhancer configured to generate an output voice signal based on the jammer suppressed signal, the noise reference signal, and a voice detection signal.

2. The voice capture system of claim 1, further comprising a filter bank configured to:

generate the first frequency domain microphone signal based on a first time domain microphone signal; and generate the second frequency domain microphone signal based on a second time domain microphone signal.

3. The voice capture system of claim 2, further comprising:

a first microphone configured to generate the first time domain microphone signal; and a second microphone configured to generate the second time domain microphone signal.

4. The voice capture system of claim 1, wherein the voice detection signal is generated by a voice activity detector based on the voice enhanced reference signal and the noise reference signal.

5. The voice capture system of claim 1, wherein the voice rejected noise beamformer is a Wiener delay and subtract noise beamformer.

6. The voice capture system of claim 1, wherein the one or more filter weights of the voice rejected noise beamformer correspond to a stock voice direction or a wearer-specific voice direction.

7. The voice capture system of claim 1, wherein the noise beamformer adjustor is configured to:

generate a signal-to-noise ratio (SNR) quality check signal based on the second frequency domain microphone signal;

generate, via a quality check voice activity detector, a voice detection quality check signal;

store, via a first data accumulator, first voice data corresponding to a relationship between the first frequency domain microphone signal and the second frequency domain microphone signal;

store, via a second data accumulator, second voice data corresponding to an energy level of the first frequency domain microphone signal; and dynamically update, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

8. The voice capture system of claim 1, where the speech enhancer is configured to generate the output voice signal by:

determining a series of speech signal-to-noise ratios (SNR) corresponding to a series of frequency bins based on the jammer suppressed signal and the noise reference signal;

comparing the speech SNRs of each frequency bin to a set of speech enhancer thresholds;

applying a noise suppression signal to each frequency bin of the jammer suppressed signal, wherein an amplitude of the noise suppression signal applied to a frequency bin of the jammer suppressed signal is related to the SNR corresponding to the frequency bin.

9. A wearable audio device comprising:

a first microphone configured to generate a first time domain microphone signal;

a second microphone configured to generate a second time domain microphone signal;

a filter bank configured to generate a first frequency domain microphone signal based on the first time domain microphone signal and a second frequency domain microphone signal based on the second time domain microphone signal;

a minimum variance distortionless response (MVDR) beamformer configured to generate a first voice beamformer signal based on the first frequency domain microphone signal and the second frequency domain microphone signal;

a delay and sum beamformer configured to generate a second voice beamformer signal based on the first frequency domain microphone signal and the second frequency domain microphone signal;

a voice rejected noise beamformer comprising one or more filter weights, the voice rejected noise beamformer configured to generate a noise reference signal based on the first frequency domain microphone signal and the second frequency domain microphone signal;

a noise beamformer adjustor configured to adjust the one or more filter weights of the voice rejected noise beamformer to account for fit variation, wherein the filter weights are adjusted based on the first frequency domain microphone signal, the second frequency domain microphone signal, and the noise reference signal;

a voice mixer configured to blend the first voice beamformer signal with the second voice beamformer signal to generate a voice enhanced reference signal, wherein an amount of the first beamformer signal as compared to the second beamformer signal in the voice enhanced reference signal is dynamically adjusted based on amplitudes of the first and the second beamformer signals;

a voice activity detector configured to generate a voice detection signal based on the voice enhanced reference signal and the noise reference signal;

a jammer suppressor configured to generate a jammer suppressed signal based on the voice enhanced reference signal and the noise reference signal; and a speech enhancer configured to generate an output voice signal based on the jammer suppressed signal, the noise reference signal, and the voice detection signal.

10. The wearable audio device of claim 9, wherein the wearable audio device is a single side wearable device.

11. The wearable audio device of claim 9, wherein the noise beamformer adjustor is configured to:

generate a signal-to-noise ratio (SNR) quality check signal based on the second frequency domain microphone signal;

generate, via a quality check voice activity detector, a voice detection quality check signal;

store, via a first data accumulator, first voice data corresponding to a relationship between the first frequency domain microphone signal and the second frequency domain microphone signal;

store, via a second data accumulator, second voice data corresponding to an energy level of the first frequency domain microphone signal; and dynamically update, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

12. The wearable audio device of claim 9, where the speech enhancer is configured to generate the output voice signal by:

determining a series of speech signal-to-noise ratios (SNR) corresponding to a series of frequency bins based on the jammer suppressed signal and the noise reference signal;

comparing the speech SNRs of each frequency bin to a set of speech enhancer thresholds;

applying a noise suppression signal to each frequency bin of the jammer suppressed signal, wherein an amplitude of the noise suppression signal applied to a frequency bin of the jammer suppressed signal is related to the SNR corresponding to the frequency bin.

13. A method for voice capture, comprising:

generating, via a minimum variance distortionless response (MVDR) beamformer, a first voice beamformer signal based on a first frequency domain microphone signal and a second frequency domain microphone signal;

generating, via a delay and sum beamformer, a second voice beamformer signal based on the first frequency domain microphone signal and the second frequency domain microphone signal:

blending, via a voice mixer, the first voice beamformer signal with the second voice beamformer signal to generate a voice enhanced reference signal, wherein an amount of the first beamformer signal as compared to the second beamformer signal in the voice enhanced reference signal is dynamically adjusted based on amplitudes of the first and the second beamformer signals;

generating, via a voice rejected noise beamformer, a noise reference signal based on the first frequency domain microphone signal and the second frequency domain microphone signal;

adjusting, via a noise beamformer adjustor, one or more filter weights of a voice rejected noise beamformer to account for fit variation, wherein the filter weights are adjusted based on the first frequency domain microphone signal, the second frequency domain microphone signal, and the noise reference signal;

generating, via a jammer suppressor, a jammer suppressed signal based on the voice enhanced reference signal and the noise reference signal; and generating, via a speech enhancer, an output voice signal based on the jammer suppressed signal, the noise reference signal, and a voice detection signal.

14. The method of claim 13, further comprising:

generating a signal-to-noise ratio (SNR) quality check signal based on the second frequency domain microphone signal;

generating, via a quality check voice activity detector, a voice detection quality check signal based on a frequency domain feedback microphone signal or the second frequency domain microphone signal;

storing, via a first data accumulator, first voice data corresponding to a relationship between the first frequency domain microphone signal and the second frequency domain microphone signal;

storing, via a second data accumulator, second voice data corresponding to an energy level of the first frequency domain microphone signal; and dynamically updating, if the SNR quality check signal exceeds an SNR quality threshold, the voice detection quality check signal exceeds a voice detection quality threshold, and the first voice data or the second voice data exceeds a storage threshold, the one or more filter weights of the voice rejected noise beamformer based on the first frequency domain microphone signal and the second frequency domain microphone signal.

15. The method of claim 13, where the speech enhancer is configured to generate the output voice signal by:

determining a series of speech signal-to-noise ratios (SNR) corresponding to a series of frequency bins based on the jammer suppressed signal and the noise reference signal;

comparing the speech SNRs of each frequency bin to a set of speech enhancer thresholds;

applying a noise suppression signal to each frequency bin of the jammer suppressed signal, wherein an amplitude of the noise suppression signal applied to a frequency bin of the jammer suppressed signal is related to the SNR corresponding to the frequency bin.

* * * * *